(12) United States Patent
Tsai et al.

(10) Patent No.: US 6,638,323 B2
(45) Date of Patent: Oct. 28, 2003

(54) EMULSION FUEL OIL ADDITIVE

(76) Inventors: Kune-muh Tsai, 4F-3, No.127, Sec. 1, Fu-Hsing South Rd., Taipei (TW); Sun Li, Room 603, No. 6, Lane 80, Kunming Rd., Shanghai (CN)

( * ) Notice: Subject to any disclaimer, the term of this patent is extended or adjusted under 35 U.S.C. 154(b) by 0 days.

(21) Appl. No.: 09/981,180

(22) Filed: Oct. 16, 2001

(65) Prior Publication Data

US 2003/0014908 A1 Jan. 23, 2003

(30) Foreign Application Priority Data

Jul. 11, 2001 (TW) ......................... 90117008 A

(51) Int. Cl.7 .............. C10L 1/32; C10L 1/18; C10L 1/12
(52) U.S. Cl. ........................... 44/301; 44/302
(58) Field of Search ................... 44/301, 302

(56) References Cited

U.S. PATENT DOCUMENTS 4,797,134 A * 1/1989 Vataru ................... 44/322
5,669,938 A * 9/1997 Schwab .................. 44/301
6,068,670 A * 5/2000 Haupais et al. ........... 44/301

* cited by examiner

Primary Examiner—Cephia D. Toomer
(74) Attorney, Agent, or Firm—Trojan Law Offices

(57) ABSTRACT

An emulsion fuel additive to be mixed with a fuel oil and water for forming an emulsion fuel oil is disclosed. The emulsion fuel oil additive includes an emulsion reagent for forming a water-in-oil (W/O) emulsion fuel oil with the fuel oil and the water, a combustion-assisting reagent for improving ignition and combustion of the emulsion fuel oil, a stabilization reagent for forming an interface membrane between the fuel oil and the water by a chemical reaction at a specific temperature, a promotion reagent for promoting emulsification of the fuel oil and the water and promoting the interface membrane formation by the stabilization reagent, and an antioxidant reagent for preventing deterioration of the emulsion fuel oil during storage.

17 Claims, No Drawings

EMULSION FUEL OIL ADDITIVE

This application claims priority to Taiwan patent application Serial No. 090117008, filed Jul. 11, 2001.

FIELD OF THE INVENTION

The present invention relates to an emulsion fuel oil additive, and more particularly to an emulsion fuel oil additive to be mixed with a fuel oil and water, so as to form a water-in-oil (W/O) type of emulsion fuel oil.

BACKGROUND OF THE INVENTION

The caloric value of combustion of fuel oil (heavy oil) can be converted to mechanical energy or electric energy, and is generally used in boilers or engines. Many countries have set standards and regulations to control the maximal permissible discharge level of pollutants to protect the environment. Thus, reducing the emitted concentration and amount of pollutants, such as sulfur oxide (SOx), nitrogen oxide (NOx) and carbon oxide (COx) as a result of fossil fuel combustion, is an important subject in environmental protection today.

To overcome the problems described above, some methods were developed to form an emulsion fuel oil by mixing a fuel oil, water and a specific additive, which reduce the employed quantity of fuel oil so as to dilute the emitted concentration of pollutants.

However, the emulsion fuel oil formed with the additive described in the prior arts has disadvantages of:

1. Instability after long time storage: The resulting emulsion fuel oil is not very stable that the water and oil are readily separated from each other. Most of the emulsion fuel oil can only maintain its emulsifying stability for a few days at room temperature. Thus, the emulsion fuel oil is usually used immediately as it is formed, and is unfavorable for large-scale production and long-distance transportation.

2. Difficult combustion ignition: It is found that such emulsion fuel oil is not easily ignited, and the caloric value of combustion goes down with increased quantity of water (for example, when the added quantity of water is 20 weight percent, the caloric value of combustion will go down to 70% as that of the same volume of fuel oil.) In addition, the emulsion fuel oil cannot be ignited easily when the added quantity of water is above 30 weight percent, which limits its industrial applicability.

It is found that the type and the amount of the additive affect the interaction between the fuel oil and water and further determine the quality of the formed emulsion fuel oil. Therefore, the present invention provides an improved emulsion fuel oil additive to overcome the problems described above.

SUMMARY OF THE INVENTION

It is an object of the present invention to provide an emulsion fuel oil additive to be mixed with a fuel oil and water for forming an emulsion fuel oil having a caloric value of combustion comparable to that of the same volume of fuel oil, so as to economize energy resources.

It is another object of the present invention to provide an emulsion fuel oil additive to be mixed with a fuel oil and water for forming an emulsion fuel oil having lower emitted concentration and amount of pollutants generated from combustion than that of the same volume of fuel oil.

It is an additional object of the present invention to provide an emulsion fuel oil additive to be mixed with a fuel oil and water for forming an emulsion fuel oil, which can be stored for a long period of time without separation of the fuel oil and the water emulsion.

It is an additional object of the present invention to provide an emulsion fuel oil additive which enables complete emulsification of fuel oil and water, and has an appropriate HLB (Hydrophilic-Lipophilic Balance) value for water-in-oil (W/O) emulsion formation, so as to generate microexplosion in combustion of the formed emulsion fuel oil for complete combustion.

It is an additional object of the present invention to provide an emulsion fuel oil additive which contains a specific stabilization reagent, such that the formed emulsion fuel oil can be stored over one year below 45° C. without separation of the fuel oil and the water emulsion.

It is an additional object of the present invention to provide an emulsion fuel oil additive which contains a specific combustion-assisting reagent, such that the formed emulsion fuel oil can be ignited easily.

It is an additional object of the present invention to provide a method for forming an emulsion fuel oil, which is simple and produces no waste water and harmful gas in the forming process.

In accordance with an aspect of the present invention, the emulsion fuel oil additive to be mixed with a fuel oil and water for forming an emulsion fuel oil includes an emulsion reagent, a combustion-assisting reagent, a stabilization reagent, a promotion reagent, and an antioxidant reagent. The emulsion reagent is used to form a water-in-oil (W/O) emulsion fuel oil with the fuel oil and the water. The combustion-assisting reagent is used to improve ignition and combustion of the emulsion fuel oil. The stabilization reagent is used to form an interface membrane between the fuel oil and the water by a chemical reaction at a specific temperature. The promotion reagent is used to promote emulsification of the fuel oil and the water, and promote the interface membrane formation by the stabilization reagent. The antioxidant reagent is used to prevent deterioration of the emulsion fuel oil during storage.

In accordance with another aspect of the present invention, the emulsion fuel oil additive to be mixed with a fuel oil and water for forming an emulsion fuel oil includes components A, B, C, D, and E. The component A is an emulsion reagent which is a blend of non-ionic surfactants and has an HLB value ranged from 2.5 to 8. The component B is a combustion-assisting reagent for improving ignition and combustion of the emulsion fuel oil. The component C is a stabilization reagent for forming an interface membrane between the fuel oil and the water by condensation of a phenol compound C1 and a polyol compound C2 at a specific temperature. The component D is a promotion reagent for promoting emulsification of the fuel oil and the water, and promoting the interface membrane formation by the stabilization reagent. The component E is an antioxidant reagent for preventing deterioration of the emulsion fuel oil during storage.

Preferably, based on 100 parts by weight of the component A, the component B is 5–60 parts by weight, the component C1 is 0.5–20 parts by weight, the component C2 is 0.5–45 parts by weight, the component D is 0.1–30 parts by weight, and the component E is 1–30 parts by weight.

Preferably, the component A includes 30–80 weight percent of polyoxyethylene aliphatic acid, 5–50 weight percent of SPAN20–80, and 5–50 weight percent of TWEEN20–80, based on the total weight of the component A.

The component B is a blend of an organic peroxide, an organic solvent, and a diluting oil.

Preferably, the organic peroxide is selected from a group consisting of benzoyl peroxide, di-tert-butyl peroxide, tert-butyl-peroxy-2-ethyl hexanoate, tert-butyl-peroxy-pivalate and the mixture thereof, the organic solvent is selected from a group consisting of diethylene glycol dibutyl ether, dibutyl phthalate, n-butyl acetate, methyl iso-butyl ketone and the mixture thereof, and the diluting oil is selected from a group consisting of diesel oil, heavy oil and the mixture thereof.

Preferably, the component B includes 50–95 weight percent of the organic peroxide and 5–50 weight percent of the organic solvent, based on the total weight of the component B.

Preferably, the component C1 is selected from a group consisting of methyl-phenol, dimethyl-phenol, butyl-phenol, octyl-phenol, sec-octyl-phenol, decyl-phenol and the mixture thereof, and the component C2 is selected from a group consisting of ethylene glycol, 1,2-propanediol, glycerol, pentaerythritol and the mixture thereof.

Preferably, the specific temperature is 70–95° C.

Preferably, the component D is an inorganic peroxide selected from a group consisting of potassium permanganate, sodium permanganate and potassium bichromate.

Preferably, the component E is selected from a group consisting of 2,6-di-tert-butyl-p-cresol, 2,6-di-tert-butyl-phenol and 2,6-di-tert-butyl-a-dimethylamino-p-cresol.

In accordance with another aspect of the present invention, a combustion-assisting reagent for improving ignition and combustion of an emulsion fuel oil is a blend of an organic peroxide, an organic solvent and a diluting oil.

Preferably, the organic peroxide is selected from a group consisting of benzoyl peroxide, di-tert-butyl peroxide, tert-butyl-peroxy-2-ethyl hexanoate, tert-butyl-peroxy-pivalate and the mixture thereof, the organic solvent is selected from a group consisting of diethylene glycol dibutyl ether, dibutyl phthalate, n-butyl acetate, methyl iso-butyl ketone and the mixture thereof, and the diluting oil is selected from a group consisting of diesel oil, heavy oil and the mixture thereof.

Preferably, the combustion-assisting reagent includes 50–95 weight percent of the organic peroxide and 5–50 weight percent of the organic solvent, based on the total weight of the combustion-assisting reagent.

In accordance with another aspect of the present invention, a stabilization reagent for forming an interface membrane between a fuel oil and water is made by condensation of a phenol compound and a polyol compound at a specific temperature.

Preferably, the phenol compound is selected from a group consisting of methyl-phenol, dimethyl-phenol, butyl-phenol, octyl-phenol, sec-octyl-phenol, decyl-phenol and the mixture thereof, and the polyol compound is selected from a group consisting of ethylene glycol, 1,2-propanediol, glycerol, pentaerythritol and the mixture thereof.

Preferably, the specific temperature is 70–95° C.

In accordance with another aspect of the present invention, a promotion reagent is used for promoting emulsification of a fuel oil and water, and promoting an interface membrane formation between a fuel oil and water.

Preferably, the promotion reagent is selected from a group consisting of potassium permanganate, sodium permanganate and potassium bichromate.

DETAILED DESCRIPTION OF THE PREFERRED EMBODIMENT

The emulsion fuel oil additive of the present invention includes components A, B, C, D and E. It is described more specifically with reference to the following embodiments.

Component A:

According to the present invention, the component A is an emulsion reagent, which is a blend of non-ionic surfactants including emulsion reagent EP-E600 series (such as EP-E635 and EP-E645 that are mainly polyoxyethylene aliphatic acid and commercially available from Chun-Yue Corp., Taipei, Taiwan), SPAN20~80 series (sorbitan fatty acid ester, such as sorbitan monolaurate (SPAN 20), sorbitan monopalmitate (SPAN 40), sorbitan monostearate (SPAN 60), sorbitan tristearate (SPAN 65), and sorbitan monooleate (SPAN 80)), and TWEEN20~80 series (polyoxyethylene sorbitan fatty acid ester, such as polyoxyethylene sorbitan monolaurate (TWEEN 20), polyoxyethylene sorbitan monopalmitate (TWEEN 40), polyoxyethylene sorbitan monostearate (TWEEN 60), polyoxyethylene sorbitan tristearate (TWEEN 65), and polyoxyethylene sorbitan monooleate (TWEEN 80)) for forming water-in-oil (W/O) non-ionic surfactants. Preferably, the HLB (Hydrophilic-Lipophilic Balance) value ranges from 2.5 to 8.

The component A, which has an appropriate HLB value for forming water-in-oil emulsion, is used to provide emulsification effect of the fuel oil and the water so as to generate microexplosion in combustion of the formed emulsion fuel oil and result in complete combustion.

Preferably, the component A includes 30–80 weight percent of polyoxyethylene aliphatic acid, 5–50 weight percent of SPAN20~80, and 5–50 weight percent of TWEEN20~80, based on the total weight of the component A.

Component B:

The component B is a combustion-assisting reagent, which is a blend of an organic peroxide, an organic solvent and a diluting oil. The organic peroxide is used to provide combustion-assisting effect to the emulsion fuel oil. The organic solvent is used to solve the organic peroxide. The diluting oil is used to dilute and/or dissolve the organic peroxide.

The organic peroxide preferably includes but is not limited to benzoyl peroxide, di-tert-butyl peroxide, tert-butyl-peroxy-2-ethyl hexanoate, tert-butyl-peroxy-pivalate and the mixture thereof.

The organic solvent preferably includes but is not limited to diethylene glycol dibutyl ether, dibutyl phthalate, n-butyl acetate, methyl iso-butyl ketone and the mixture thereof.

The diluting oil preferably includes but is not limited to diesel oil, heavy oil and the mixture thereof.

Preferably, the component B includes 50–95 weight percent of the organic peroxide and 5–50 weight percent of the organic solvent, based on the total weight of the component B.

Component C:

The component C is a stabilization reagent made by condensation of a component C1 and a component C2, which can form a stable interface membrane between the fuel oil and the water at 70–95° C. in the process of emulsification under suitable reaction condition. The emulsion fuel oil formed with such stabilization reagent can be stored for a long period of time without separation of the fuel oil and the water.

The component C1 is a phenol compound which preferably includes but is not limited to methyl-phenol, dimethyl-phenol, butyl-phenol, octyl-phenol, sec-octyl-phenol, decyl-phenol and the mixture thereof.

The component C2 is a polyol compound which preferably includes but is not limited to ethylene glycol, 1,2-propanediol, glycerol, pentaerythritol and the mixture thereof.

Component D:

The component D is a promotion reagent which is used to promote emulsification of the fuel oil and the water, and promote reaction between the component C1 and the component C2 for forming an interface membrane. The component D preferably includes but is not limited to potassium permanganate, sodium permanganate and potassium bichromate.

Component E:

The component E is an antioxidant reagent which is used to prevent deterioration due to oxidation, such that the formed emulsion fuel oil can be stored for a long period of time. A general antioxidant (or antiseptic) can be used as the component E, such as 2,6-di-tert-butyl-p-cresol, 2,6-di-tert-butyl-phenol and 2,6-di-tert-butyl-a-dimethylamino-p-cresol.

Preferably, based on 100 parts by weight of the component A, the emulsion fuel oil additive of the present invention is prepared by using 5–60 parts by weight of the component B, 0.5–20 parts by weight of the component C1, 0.5–45 parts by weight of the component C2, 0.1–30 parts by weight of the component D, and 1–30 parts by weight of the component E.

EXAMPLES 1–10
(Preparation of emulsion fuel oil additive)

The components A (the weight ratio of EP-E635, SPAN65 and TWEEN65 is 5:4:1), B (the weight ratio of organic peroxide, organic solvent and diluting oil is 6:2:2), C1, C2, D and E are put into a 1 liter container. The weight of each component is listed in Table 1 (wherein the unit of each component is gram). The emulsion fuel oil additive of the present invention can be formed by stirring and mixing the components well.

TABLE 1

Preparation of emulsion fuel oil additive

| Example | A | B | C1 | C2 | D | E |
|---|---|---|---|---|---|---|
| 1 | 100 | 60 | 18 | 30 | 12 | 25 |
| 2 | 100 | 50 | 18 | 24 | 10 | 5 |
| 3 | 100 | 50 | 15 | 8 | 8 | 1 |
| 4 | 100 | 40 | 10 | 45 | 15 | 30 |
| 5 | 100 | 40 | 10 | 30 | 25 | 24 |
| 6 | 100 | 30 | 8 | 12 | 5 | 30 |
| 7 | 100 | 30 | 5 | 3 | 3 | 10 |
| 8 | 100 | 20 | 0.5 | 2 | 0.1 | 2 |
| 9 | 100 | 10 | 3 | 6 | 18 | 5 |
| 10 | 100 | 5 | 2 | 05 | 10 | 14 |

EXAMPLE 11
(Preparation of emulsion fuel oil)

10 grams of additive prepared from one of Examples 1–10 is mixed with 650 grams of fuel oil and 350 grams of water, and are preheated to 70–95° C. Then, the resulting mixture is stirred to perform initial emulsification of the fuel oil and the water. Subsequently, the emulsion fuel oil is formed by rapid stirring.

When compared with the same volume of fuel oil, the caloric value of combustion of the emulsion fuel oil, which is formed by mixing fuel oil, water and the additive according to the present invention, is comparable. Moreover, the emission of pollutants after combustion of the emulsion fuel oil is about 40–60% as that of the same volume of fuel oil. After tested in boilers for combustion, the emitted concentrations of NOx and SOx of the emulsion fuel oil are respectively 120–160 ppm and 180–260 ppm, which are much lower than that of fuel oil under the same condition and equipment (the emitted concentrations of NOx and SOx of fuel oil are measured as 240–380 ppm and 350–470 ppm, respectively). In addition, the emulsion fuel oil of the present invention can be stored for over one year below 45° C. without separation of the fuel oil and the water.

In conclusion, the emulsion fuel oil, which is formed by mixing fuel oil, water and the additive of the present invention, has lower emission of pollutants and can be stored over one year below 45° C. without separation of the fuel oil and the water, such that it's suitable for large-scale production and long-distance transportation. Moreover, even when the water content of the emulsion fuel oil is over 30% by weight, the caloric value of combustion thereof can still be comparable to that of the same volume of fuel oil. In addition, the method for forming the emulsion fuel oil additive is just to mix all of the components, which is simple and produces no waste water and harmful gas in the forming process.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An emulsion fuel oil additive to be mixed with a fuel oil and water for forming an emulsion fuel oil, comprising:

an emulsion reagent for forming a water-in-oil (W/O) emulsion fuel oil with said fuel oil and said water;

a combustion-assisting reagent for improving ignition and combustion of said emulsion fuel oil;

a stabilization reagent for forming an interface membrane between said fuel oil and said water by a condensation reaction of said stabilization reagent at 70–95° C.; and a promotion reagent for promoting emulsification of said fuel oil and said water, and promoting said interface membrane formation by said stabilization reagent.

2. The emulsion fuel oil additive according to claim 1, further comprising an antioxidant reagent for preventing deterioration of said emulsion fuel oil during storage.

3. The emulsion fuel oil additive according to claim 1, wherein said emulsion reagent is a non-ionic surfactant.

4. The emulsion fuel oil additive according to claim 3, wherein said non-ionic surfactant has an HLB (Hydrophilic-Lipophilic Balance) value ranged from 2.5 to 8.

5. The emulsion fuel oil additive according to claim 1, wherein said stabilization reagent comprises a phenol compound and a polyol compound.

6. The emulsion fuel oil additive according to claim 1, wherein said combustion-assisting reagent is a blend of an organic peroxide, an organic solvent and a diluting oil.

7. The emulsion fuel oil additive according to claim 1, wherein said promotion reagent is an inorganic peroxide.

8. An emulsion fuel oil additive to be mixed with a fuel oil and water for forming an emulsion fuel oil, comprising:

an emulsion reagent A which is a blend of non-ionic surfactants and has an HLB (Hydrophilic-Lipophilic Balance) value ranged from 2.5 to 8;

a combustion-assisting reagent B for improving ignition and combustion of said emulsion fuel oil;

a stabilization reagent C comprising a phenol compound C1 and a polyol compound C2 for forming an interface membrane between said fuel oil and said water by condensation of said phenol compound C1 and said polyol compound C2 at 70–95° C.; and a promotion reagent D for promoting emulsification of said fuel oil and said water, and promoting said interface membrane formation by said stabilization reagent.

9. The emulsion fuel oil additive according to claim 8, further comprising an antioxidant reagent E for preventing deterioration of said emulsion fuel oil during storage.

10. The emulsion fuel oil additive according to claim 9, wherein said component E is selected from a group consisting of 2,6-di-tert-butyl-p-cresol, 2,6-di-tert-butyl-phenol and 2,6-di-tert-butyl-α-dimethylamino-p-cresol.

11. The emulsion fuel oil additive according to claim 9, wherein based on 100 parts by weight of said component A, said component B is 5–60 parts by weight, said component C1 is 0.5–20 parts by weight, said component C2 is 0.5–45 parts by weight, said component D is 0.1–30 parts by weight, and said component E is 1–30 parts by weight.

12. The emulsion fuel oil additive according to claim 8, wherein said component A comprises 30–80 weight percent of polyoxyethylene aliphatic acid, 5–50 weight percent of sorbitan fatty acid ester, and 5–50 weight percent of polyoxyethylene sorbitan fatty acid ester, based on the total weight of said component A.

13. The emulsion fuel oil additive according to claim 8, wherein said component B is a blend of an organic peroxide, an organic solvent and a diluting oil.

14. The emulsion fuel oil additive according to claim 13, wherein said organic peroxide is selected from the group consisting of benzoyl peroxide, di-tert-butyl peroxide, tert-butyl-peroxy-2-ethyl hexanoate, tert-butyl-peroxy-pivalate and a mixture thereof, said organic solvent is selected from the group consisting of diethylene glycol dibutyl ether, dibutyl phthalate, n-butyl acetate, methyl iso-butyl ketone and a mixture thereof, and said diluting oil is selected from the group consisting of diesel oil, heavy oil and a mixture thereof.

15. The emulsion fuel oil additive according to claim 13, wherein said component B comprises 50–95 weight percent of said organic peroxide and 5–50 weight percent of said organic solvent, based on the total weight of said component B.

16. The emulsion fuel oil additive according to claim 8, wherein said component C1 is selected from the group consisting of methyl-phenol, dimethyl-phenol, butyl-phenol, octyl-phenol, sec-octyl-phenol, decyl-phenol and a mixture thereof, and said component C2 is selected from the group consisting of ethylene glycol, 1,2-propanediol, glycerol, pentaerythritol and a mixture thereof.

17. The emulsion fuel oil additive according to claim 8, wherein said component D is selected from the group consisting of potassium permanganate, sodium permanganate and potassium bichromate.

\* \* \* \* \*